COLOR TELEVISON IMAGE REPRODUCING SYSTEM

Filed July 28, 1954 2 Sheets-Sheet 1

INVENTOR.
JAMES W. SCHWARTZ
BY
ATTORNEY

June 12, 1956 J. W. SCHWARTZ 2,750,533

COLOR TELEVISON IMAGE REPRODUCING SYSTEM

Filed July 28, 1954 2 Sheets-Sheet 2

INVENTOR.
JAMES W. SCHWARTZ
BY
[signature]
ATTORNEY

United States Patent Office 2,750,533 Patented June 12, 1956

2,750,533

COLOR TELEVISION IMAGE REPRODUCING SYSTEM

James W. Schwartz, Princeton, N. J., assignor to Radio Corporation of America, a corporation of Delaware Application July 28, 1954, Serial No. 446,243

14 Claims. (Cl. 315—10)

This invention relates to television systems and more particularly to systems for maintaining beam registry in television systems.

One system for reproducing images in color utilizes a plurality of electron beams which are all deflected by a common deflection system. Each of the electron beams is modulated by the signal representative of one of the selected component colors of the televised image. In such a system a multiple element target screen is provided, each of the multiple elements taking the form of various selected component color light producing strips. The arrangement may be such that a plurality of horizontal strip-like selected component color light producing strips are provided along which, an appropriately designated scanning beam is deflected to produce a light image. Each of the phosphor strips has a sub-elemental width such that a group of strips has a combined width which is no greater than one of the dimensions of an elemental image area. Each group of phosphor strips includes at least one of each of a plurality of component colors of an image to be reproduced. It will be understood that any deviation from accurate scanning of the horizontal strips will cause serious error in color reproduction. There thus arises a necessity for accurate scanning or vertical beam positioning. Such a requirement is also present in several other types of color television systems utilizing a device employing a cathode ray beam.

A method of generating a control signal to be used in connection with a cathode ray beam system to control electron beam scanning may utilize signal forming materials placed on the target screen, which will form a signal when struck by electrons in the electron beam. The signal so formed may then be detected and utilized in various ways for control purposes. Among the signal forming materials which may be used is ultraviolet light emitting phosphor. Ultraviolet light emitting phosphor has the advantage that light emitted therefrom may be separated from light radiations falling within the visible range and the signal therefore will not be effected by other light sources in the cathode ray tube.

The present invention in its more general form contemplates the use of a plurality of rows of signal forming discrete areas placed on the target screen of a cathode ray tube to generate electrical signals which are utilized to control electron beam positioning. The rows of signal forming material are so placed on the target screen that electron beams in traversing over a light producing strip will cause alternating energy signals to be generated of two different frequencies, for each beam. Each of the electron beams is modulated by a different signal, such that the alternating energy signals may be identified with a particular beam. The magnitude of the energy signals of the different frequencies are indicative of the electron beam positioning within an elemental area. The alternating energy signals identified with each electron beam are then converted into separate electrical signals and are compared in magnitude with each other. The comparison of the signals results in a difference signal which may be utilized to adjust the electron beam positioning.

An object of this invention is to provide an improved color television image reproducing system.

Another object of this invention is to provide improved vertical registry in color television image reproduction.

A further object of this invention is to provide an improved system for more accurately accomplishing electron beam positioning.

Other and incidental objects of this invention will be apparent to those skilled in the art from reading the following specification and on inspection of the accompanying drawings in which.

Figure 1:
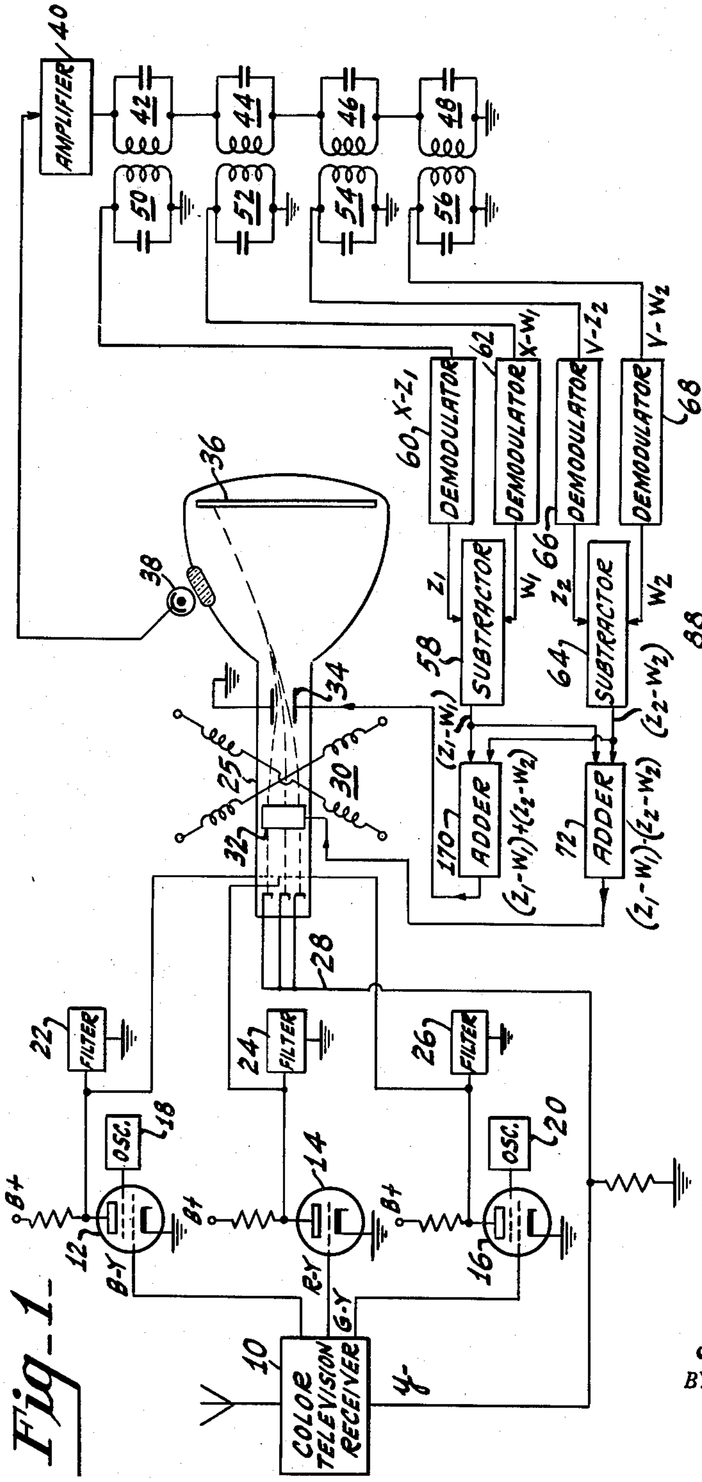
Figure 1 shows a circuit and block diagram of one form of this invention.

In Figure 1 there is shown a color television receiver 10 which may be utilized to receive color television signals. Such a receiving system is shown and described in "Electronics," dated February 1952, page 88. The color television receiver 10 has output terminals connected to grids of vacuum tubes 12, 14 and 16. The signals from the color television receiver 10 which are applied to the grids of the tubes 12, 14 and 16 are color difference signals, B–Y, R–Y, and G–Y. Vacuum tubes 12 and 16 also have other grids which are connected to oscillators 18 and 20 for modulating the signals from the color television receiver 10. The outputs from the vacuum tubes 12, 14 and 16 are connected to three separate control grids of an image reproducing tube 25. Filtering means 22, 24 and 26 are connected between the outputs of the vacuum tubes 12, 14 and 16 and a source of ground potential for removing certain frequencies from the output signals from vacuum tubes 12, 14 and 16. The color television receiver 10 has another output signal, Y, which is connected to all of the cathodes 28 of the image reproducing tube 25. Color signals may be formed by adding the output signals from the receiver 10, for example, when the B–Y signal is added to the Y signals the blue component color signal results.

The image reproducing tube 25 is provided with deflection coils 30, convergence electrode 32, and an auxiliary deflection plate 34. An image screen 36 is positioned within the image reproducing tube 25 such as to be struck by electron beams generated within the tube 25. The image screen 36 will be described in full detail below. A photocell 38 is positioned exterior to the image reproducing tube 25 in such a manner that the photocell 38 may receive light energy emitted at the image screen 36. The photocell 38 is connected to an amplifier 40 wherein a signal from the photocell 38 is amplified. After being amplified the signal from the photocell 38 is coupled to a series of frequency discriminating circuits 42, 44, 46 and 48, each of which has a different frequency response. The frequency discriminating circuits 42, 44, 46 and 48 are inductively coupled respectively to tank circuits 50, 52, 54 and 56. Signals from the tank circuits 50 and 52 are connected to be subtracted in a subtractor circuit 58 after passing through a demodulator 60 and a demodulator 62 respectively. The tank circuits 54 and 56 are similarly connected to a subtractor circuit 64 through a demodulator 66 and a demodulator 68 respectively. The subtractor circuit 58 is connected to both an adder circuit 170, and an adder circuit 72. The subtractor circuit 64 is also connected to the adder circuit 170 and the adder circuit 72. The adder circuit 170 has its output connected to the auxiliary deflecting means 34, of the image reproducing tube 25 to vary beam deflection in the image tube 25. The adder circuit 72 is connected to the convergence control electrode 32 for varying the position of electron beams in the image tube 25 with respect to each other.

Figure 2:
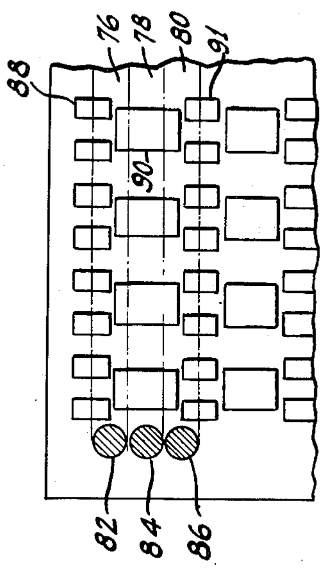
Figure 2 shows an arrangement of various materials placed on an image screen to be utilized in the practice of this invention.

Before describing the operation of Figure 1, reference will be had to Figure 2 which shows, in greater detail, the image screen of the image reproducing tube 25. In Figure 2 there are shown representations of horizontal lines of colored light emitting phosphor strips. Strip 76 emits a blue light upon being struck by electrons from an electron beam, strip 78 represents a red light emitting phosphor and strip 80 represents a green light emitting phosphor. There are shown three electron beam spots 82, 84 and 86 indicating areas of beam impingement indicative of electron beams used for scanning the phosphor strips 76, 78 and 80 respectively. Superimposed upon the colored light emitting phosphor strips 76, 78 and 80 are signal generating areas in rows 88, 90 and 91. These signal generating areas may be composed of various materials, however, in the illustrative embodiment, ultraviolet light emitting phosphors are used. At the time when an electron beam is properly vertically positioned to scan a phosphor strip 76, or follow the path set out by strip 76, the beam spot 82 for example, will impinge wholly upon the phosphor strip 76. During the correct scanning of the system shown, the three electron beams, shown by beam spots 82, 84 and 86, must be such as to impinge only upon the three phosphor strips 76, 78 and 80 respectively.

In the operation of the image tube 25, containing a screen 36 as shown in detail in Figure 2, consider first that the electron beam indicated by the beam spot 82 is swept across the blue emitting phosphor strip 76. As the beam spot impinges upon the ultraviolet ray emitting phosphor areas in rows of areas 88 and 90, ultraviolet light will be emitted at two different frequencies. The first frequency will depend upon the speed with which the beam spot 82 is swept across the areas in row 88. The second frequency will likewise depend upon speed, however, the speed with which the spot 82 is swept across row of areas 90. Phosphor strip 80 is also provided with two rows of ultraviolet light emitting rows of areas 90 and 91. A similar pair of signals to those generated when an electron beam is traversed across the strip 76, will be generated when an electron beam is traversed across strip 80.

Consider now the operation of the system shown by the circuit and block diagram of Figure 1. The color signals after passing through the color television receiver 10 are formed into a first signal, B–Y, a second signal, R–Y, a third signal, G–Y, and a fourth signal, Y. These signals are so composed that the combination of the Y signal with any of the other signals will result in a signal representative of a component color signal. For example, if the G–Y signal is added to the Y signal the result will be a G signal which is indicative of the green signal, similarly, R–Y plus Y produces a red representative signal and B–Y plus Y produces a blue representative signal.

The B–Y signal from the color television receiver 10 is added to a signal from the oscillator 18 in tube 12. The signal output from the tube 12 therefore contains the partial blue image signal B–Y and a subcarrier signal having the same frequency as oscillator 18. The R–Y output from color television receiver is passed through tube 14 uneffected. The G–Y signal from the color television receiver 10 is added in tube 16 to a signal from the oscillator 20, therefore the output from the tube 16 contains not only the G–Y video information but also a subcarrier of the frequency of oscillator 20. The signals from oscillators 18 and 20 are of different frequencies, are preferably not harmonically related, and are above the video frequency range. Consider for example, that the frequency from a signal from oscillator 18 is $x$ and that the frequency of signals from oscillator 20 is V. The output signals from the tubes 12, 14 and 16 after being individually filtered are applied to separate control grids of the image reproducing tube 25. The Y signal from the color television receiver 10 is applied to the cathodes 28 of the color television image reproducing tube 25. The signals G–Y, R–Y, B–Y are thus individually added to the Y signal in the image reproducing tube 25 by application of the signals so added to the control grids of the tube 25 and the cathodes 28 of the tube 25. There are thus created three electron beams each having a component color representing signal modulated thereon, and two of the beams having signals of subcarrier frequencies X and V additionally added thereto.

Consider the three electron beams impinging upon the image screen 36 with reference to Figure 2. Beam spot 82 which will be utilized for scanning the blue light emitting phosphor strip 76 contains a modulated subcarrier signal of frequency X, and the electron beam spot 86 utilized for scanning the green light emitting phosphor strip 80, is modulated by a subcarrier of frequency V. As the beam spots 82 and 86 are deflected across their respective phosphor strips 76 and 80, there will be energy in the form of ultraviolet light emitted from the rows of areas 88, 90 and 91. The ultraviolet light caused to be emitted by the electron beam spot 82 will contain in addition to the signals generated by the energy emissive material, a further signal which varies at a rate of frequency X, due to the fact that the electron beam spot 82 is intensity modulated by this frequency. The frequency of signals emitted by scanning the row of areas 88 at a particular scanning speed will be called signal frequency Z, and the frequency of signals generated by scanning the row of areas 90 at the particular scanning speed will be called signal frequency W. To further distinguish the frequency signals, the signals caused to be formed by beam spot 82 will be referred to as signals $Z_1$ and $W_1$. Frequency signals caused to be emitted by the beam spot 86 will be called $Z_2$ and $W_2$. The $Z_1$ and $Z_2$ signals are of a similar frequency, however, separate notation is desirable for purposes of explanation, similarly, the $W_1$ and the $W_2$ signals. The light signals caused to be emitted by the electron beam spot 82 will thus contain frequency components X—Z1 and X—W1. Signals generated by electron beam spot 86 during the scanning operation will contain frequency components V—$Z_2$ and V—$W_2$. These signals with others are sensed by the photocell 38 and converted from light signals into electrical signals. The resulting electrical signals are amplified in the amplifier 40 and then fed to the frequency discriminating circuits 42, 44, 46 and 48. The frequency discriminating circuit 42 with the tank circuit 50 is so constructed as to filter the frequency component signals having a frequency X—Z1. Frequency discriminating circuit 44 and tank circuit 52 are so constructed as to filter the frequency component signals having a frequency X—W1. The frequency discriminating circuit 46 in conjunction with the tank circuit 54 filters signals of a frequency V—Z2 and the frequency discriminating circuit 48 and the tank circuit 56 filter signals of a frequency V—W2. The signals from the tank circuits 50 and 52 are fed to demodulators 60 and 62 wherein the frequency component X is removed from the signals X—Z1 and X—W1. The output from demodulator 60 is thus a signal Z1 which is indicative of the degree to which the electron beam spot 82 impinges upon the row of areas 88. The output from demodulator 62 is a signal W1, the amplitude of which is indicative of the degree to which the electron beam spot 82 impinges upon the phosphor elements in row 90. Similarly the signals V—$Z_2$ and V—$W_2$ from the tank circuits 54 and 56 are demodulated in demodulators 66, and 68 and result in signals of frequency $Z_2$ and $W_2$ which are indicative of the degree to which the electron beam spot 86 impinges upon row of areas 90 and the degree to which the electron beam spot 86 impinges upon row of areas 91 respectively. The signal from the demodulator 60, Z1, and the signal from demodulator 62, W1, are subtracted from each other in the subtractor circuit 58 to result in a direct current signal which varies as Z1—W1. Signals fed to the subtractor circuit 64, Z2 and W2 are subtracted to form a direct current signal which varies as Z2—W2.

The actual content of Z1—W1 is indicative of the degree to which the electron beam spot 82 varies from the center of the blue light emitting strip 76. The actual content of the signal Z2—W2 is similarly indicative of the degree of variance between the correct position of electron beam spot 86 and the actual position of electron beam spot 86. This is true because the areas in row 88 and row 90 total the same area and therefore if an electron beam spot 82 is so positioned as to equally divide its electrons between the two rows 88 and 90, of energy emitting material areas, the energy emitted from each of the rows would be equal and thus when subtracted would result in zero. If, however, more of the electrons in the beam indicated by beam spot 82 impinges upon the areas of row 88, than impinge on the row of areas 90, then the energy content of the signal Z1 which is dependent upon the number of electrons striking areas in row 88 will be larger than the energy content of the signal W1 which is dependent upon the number of electrons striking areas in row 90. The signal Z1—W1 which is the difference between the two signals, Z1 and W1, consequently indicates the elemental variance from correct centering of the electron beam spot 82 in either a positive or a negative manner. Similarly the signal Z2—W2 indicates the elemental variance from correct positioning of electron beam spot 86. In the event the electron beam spot 82 is positioned too high and impinges to a greater degree upon row of areas 88 than upon row of areas 90, the signal Z1—W1 will be a positive quantity, however, in the event electron beam spot 82 impinges more upon row of areas 90 than upon row of areas 88 the quantity Z1—W1 will be negative due to the action of subtractor circuit 58. In the event the electron beam spot 86 impinges to a greater degree on row of areas 90 than on row of areas 91 the quantity Z1—W1 will be positive, however, again if the reverse is true, the quantity Z2—W2 will be negative. The quantities Z1—W1 and Z2—W2 are added in the adder circuit 70. In the event both quantities are positive, which indicates that both electron beams 82 and 86 are too high on the image screen 36, the correction potential will be derived by the addition, and will be applied to the auxiliary deflecting means 34 of image reproducing tube 5 thereby deflecting both the electron beam spots 82 and 86 downward, thereby tending to correct their vertical positioning. For this condition the two quantities, Z1—W1 and Z2—W2 when fed to the subtractor circuit 72, will cancel and the convergence, or the proximity, with respect to each other of the electron beams, will remain unchanged. Assume now that the electron beam spot 82 is positioned too high and that the electron beam spot 86 is positioned too low. Under these conditions the quantity Z1 will be greater than the quantity W1, therefore resulting in a positive correction voltage for the quantity Z1—W1. W2 however, will be larger than Z2 causing the quantity Z2—W2 to be negative. When the positive and negative quantities, which for example, will be chosen of equal magnitude, are coupled to the adder circuit 70, they will cancel out and the auxiliary beam deflecting means 34 will receive no correction voltage. However, when the positive and negative quantities are fed to the subtractor circuit 72 they will not cancel but are totalized to result in a voltage which when applied to the convergence electrode 32 will re-position the electron beam spots 82 and 86 with respect to each other, by bringing them nearer together, and in this manner causing both beam spots to fall solely upon one of the phosphor strips. The electron beam spot 84 will always be midway between the electron beam spots 82 and 86 due to the basic construction of the beam forming and deflecting system.

To consider a further example, assume that the electron beams 82 and 86 are positioned such that they are too close to each other, such that they both impinge upon row of areas 90 to the same greater degree than they impinge upon the rows of smaller areas 88 and 91. Under these conditions the quantity W1 will be larger than Z1 such that the quantity Z1—W1 becomes negative, and the quantity Z2 will be larger than the quantity W2 thereby causing the quantity Z2—W2 to be positive. When the positive voltage Z2—W2 is added to the negative voltage Z1—W1 in the adder circuit 70, the result is zero and the beams are not effected by the auxiliary beam deflecting means 34, however, when the positive and negative voltages are subtracted in subtractor circuit 72, the result is a negative voltage equal in magnitude to the sum of the two different voltages. The negative correction voltage from subtractor circuit 72 is applied to the convergence electrode 32 and has the opposite effect of the previously described positive voltage applied to the convergence electrode, and causes the electron beam spots 82 and 86 to be moved farther apart to correct positions.

It may therefore be seen that the system provides a means of accurately positioning the electron beams within elemental areas, both with respect to the image screen 36, and with respect to each other. The video signal may, during some periods contain frequency components which coincide with the frequency components to be used in the correction circuit. A system for combatting the generation of false control voltages consists of the filter circuits 22, 24 and 26 which eliminate the frequency components from the video signal which could otherwise cause false registry. These filters may be eliminated by proper choice of control frequencies.

Figure 3:
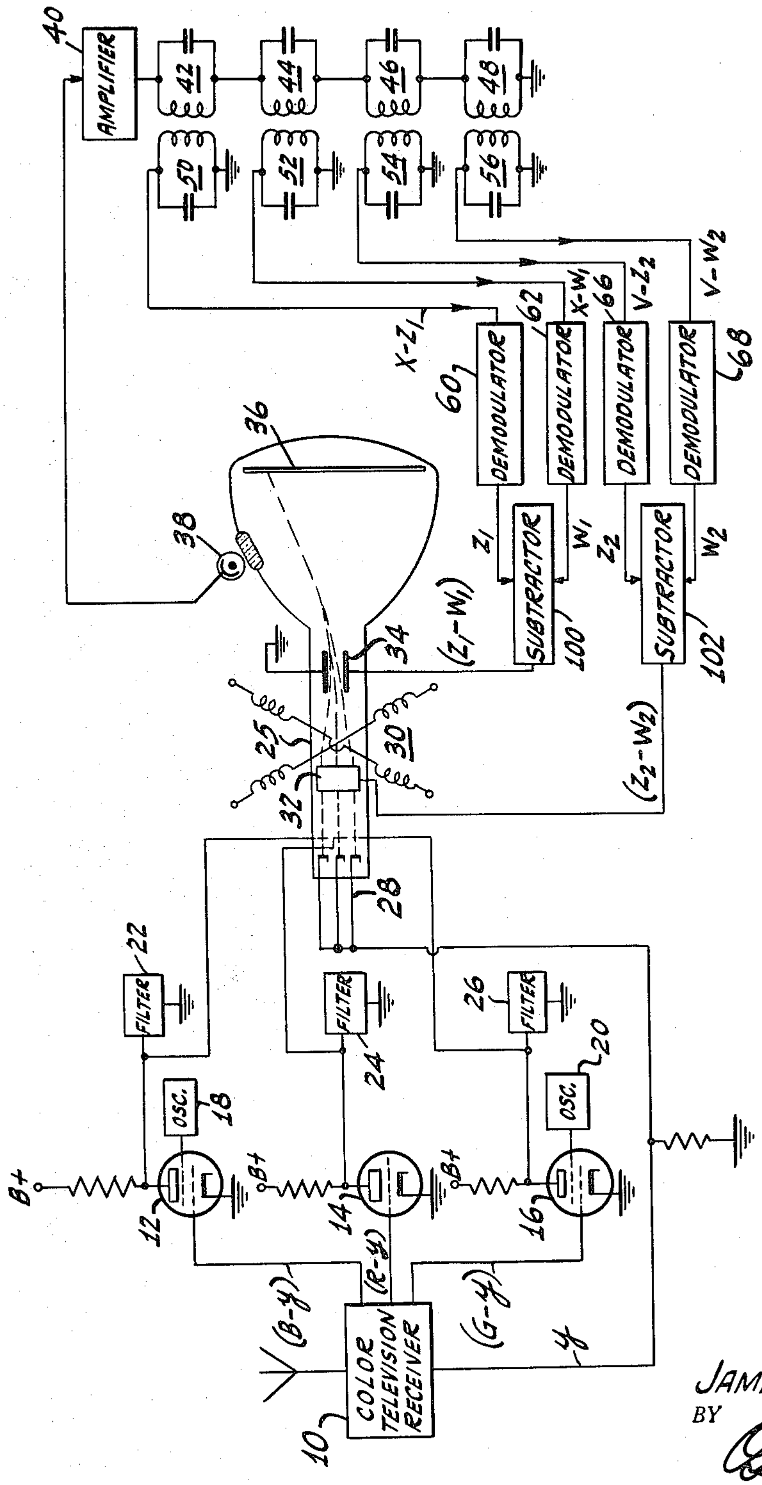
Figure 3 shows a block and circuit diagram of another form of this invention.

Referring now to Figure 3 in which all similar elements are similarly numbered to similar elements of Figure 1. In Figure 3 the output from the demodulators 60, 62, 66 and 68 are coupled to subtractor circuits 100 and 102. The demodulators 60 and 62 being connected to the subtractor circuit 100, and demodulators 66 and 68 being connected to the subtractor circuit 102. The output from the demodulator 60, Z1 is again indicative of the degree to which the electron beam spot 82 impinges upon row of areas 88, and the signal from demodulator 62, W1, is indicative of the degree to which the electron beam spot 82 falls upon row of areas 90. The signal from the demodulator 66, Z2 is indicative of the degree to which the electron beam spot 86 falls upon row of areas 90, and the output from demodulator 68, W2, is determined by the number of electrons in the electron beam indicated by beam spot 86 which fall onto areas in row 88.

In the system shown in Figure 1, the procedure was to continually correct for position and convergence of the electron beams by combining the control signals, however, in the system shown in Figure 3, the procedure carried out is to position electron beam spot 82 correctly with respect to the image screen 36, and position electron beam spot 86 with respect to electron beam spot 82. The positioning of the electron beam spot 82 is carried out by comparing signals Z1 and W1 in the subtractor circuit 100 to generate a correction signal and coupling the correction signal to the auxiliary deflecting means 34. Signals Z2 and W2 are then compared in the subtractor circuit 102 to generate a correction signal which is fed to the convergence electrode 32 to correctly position the electron beam 86 with respect to electron beam 82, and thereby, as before, automatically positioning the electron beam spot 84.

The manner of operation of the circuit shown in Figure 3 is as follows: Assume the positioning of beam spot 82 in Figure 2 is such that the beam spot 82 impinges to a greater degree on row of areas 88 than it does on row of areas 90, in other words, beam spot 82 is positioned too high. In this case, the demodulated voltage Z1 will be of greater magnitude than the demodulated voltage W1. The subtraction of the two voltages will thus result in a positive voltage which will cause electron beam spot 82 to be moved downward when applied to the auxiliary deflecting means 34. In the event the voltage W1 is larger than the voltage Z1 the electron beam spot 82 will be positioned too low with respect to the phosphor strip 76 and the addition of the voltages in adder circuit 100 will result in a negative correction voltage which will have the opposite effect of a positive correction voltage, and cause the electron beam to be shifted upward, when applied to the auxiliary deflecting means 34. The correct positioning of the electron beams 82 and 86 with respect to electron beam spot 84 depends upon the magnitude of voltages Z2 and W2. If electron beam spot 82 is correctly positioned, but electron beam spot 86 is positioned too high, such that more of its electrons fall upon row of areas 90, than fall upon row of areas 91, then the voltage Z2 will be of greater magnitude than the voltage W2. The combination of voltages Z2 and W2 in subtractor circuit 102 will result in a difference signal of a positive nature which will cause the convergence electrode 32 to shift electron beam spot 86 downward to its correct position with respect to electron beam spot 82. Incorrect positioning of electron beam spot 86 in the opposite direction would cause a negative correction voltage to be generated which would cause the convergence electrode to move electron beam spot 86 upward with respect to electron beam spot 82. Again in the system of Figure 3 as in the system of Figure 1, the position of the electron beam spot 84 always lies substantially midway between the electron beam spots 82 and 86, due to the inherent nature of this system. It may be seen that the convergence electrode portion of this system could be eliminated in the event such a control system were to be applied to an electron beam scanning system utilizing only a single electron beam.

In the use of the systems shown in Figures 1 and 3 it is to be noted that the system operates from a null point without reference to any particular level. That is, the system acts to compare two quantities, which are generated by the system, to effect control. The effects of extraneous factors will thus be present in both of the quantities and will tend to balance out. The advantages of such a system are that variations of the quantities within the system such as electron beam spot size, and video signal variations need not be compensated for in the correction system.

Having thus described the invention, what is claimed is:

1. A system for controlling a plurality of cathode ray beams comprising a target electrode, said target electrode including a luminescent screen having a plurality of substantially parallel strips of material capable respectively of producing light of the different component colors in response to excitation by said cathode ray beams, said electrode further including rows of discrete areas of energy emissive material superimposed upon said parallel strips in such a manner that certain of said cathode ray beams may strike areas in a plurality of rows of said areas during a particular scanning line, means for modulating the energy emissions caused by each of a plurality of said cathode ray beams by a different modulating signal, means for converting said energy emissions into an electrical signal, means for separating said electrical signal into a plurality of electrical signals, said plurality of electrical signals constituting a first and a second modulated signal for each of said certain of said cathode ray beams, means for demodulating said first and said second modulated signals to form a plurality of first and second demodulated signals, each of said first and said second demodulated signals being indicative of the degree to which said certain of said cathode ray beams impinge upon said rows of energy emissive areas, means for comparing certain of said demodulated signals to form correction signals, each of said correction signals being such as to vary as the elemental deflection of each of said certain of said cathode ray beams, and cathode ray beam positioning means for varying the position of said cathode ray beams commensurate with the magnitude of said correction signals.

2. Apparatus according to claim 1 wherein said means for separating said electrical signals into a plurality of electrical signals comprising a series of frequency discriminating circuits.

3. Apparatus according to claim 1 wherein said energy emissive material comprises a phosphor material, and said means for converting said energy emissions into an electrical signal comprises a photoelectric cell circuit.

4. A system for controlling a plurality of cathode ray beams comprising a target electrode, deflecting means for deflecting said cathode ray beams, modulating means for modulating certain of said cathode ray beams with a control signal, said target electrode including a luminescent screen having superimposed thereon a plurality of rows of discrete areas of material for providing an emitted signal in response to excitation by said cathode ray beams and disposed in such a manner that certain of said cathode ray beams may strike certain of said areas in at least a first and a second row of said areas during a particular scanning line, means for generating an electrical signal in response to said emitted signal, means for separating said signal into at least a first and a second pair of signals, said first pair of signals being representative of the elemental position of one of said cathode ray beams, said second pair of signals being representative of the elemental position of another of said cathode ray beams, signal combining means for combining certain of said first and said second pairs of signals to form combined signals, and means for positioning said cathode ray beams commensurate with the magnitude of said combined signals.

5. Apparatus according to claim 4 wherein said means for positioning said cathode ray beams comprise auxiliary deflecting means, and convergence control means.

6. In a television system wherein a plurality of electron beams scan a target screen, a system for controlling said electron beams comprising; means for modulating certain of said electron beams with certain alternating signals, said target electrode including rows of discrete areas of energy emissive material for producing an emitted signal in response to excitation by said cathode ray beams, said rows of discrete areas being so arranged that certain of said electron beams may impinge on areas in at least two of said rows of areas during a particular scanning line, sensing means for sensing said emitted signal, said sensing means being operative to generate an electrical signal which varies in response to said emitted signal, separating means for separating said electrical signal into a plurality of modulated signals, each of said modulated signals comprising signals emitted from one of said rows of energy emissive material, means for demodulating said modulated signals to form demodulated signals, means for combining said demodulated signals to form correction signals, said correction signals being indicative of the position of said certain of said electron beams, and means for controlling the position of said certain of said electron beams commensurate with the magnitude of said correction signals.

7. Apparatus according to claim 6 wherein said means for modulating certain of said electron beams with certain alternating signals comprises an electron discharge device adapted to be energized and having a first grid connected to receive said certain alternating signals, and a second grid connected to receive a signal for forming said electron beams.

8. Apparatus according to claim 6 wherein said sensing means comprises a photoelectric cell adapted to be energized and having an output circuit for developing an electrical signal which varies as the current in said photoelectric cell.

9. Apparatus according to claim 6 wherein said means for positioning said cathode ray beam comprises a convergence electrode for adjusting the convergence of said electron beams and a deflection electrode for adjusting the deflection of said electron beams.

10. In a television system wherein a beam deflecting means cause a plurality of electron beams to scan a target screen, a system for controlling said electron beams comprising; means for modulating certain of said electron beams with certain alternating signals, said target screen including rows of discrete areas of energy emissive material for providing an emitted signal in response to excitation by said electron beams, said rows of discrete areas being so arranged that certain of said electron beams may impinge on areas in at least two of said rows of areas during a particular scanning line, sensing means for sensing said emitted signal, said sensing means being operative to generate an electrical signal which varies as said energy emissions, separating means for separating said electrical signal into a plurality of modulated signals, each of said modulated signals comprising signals emitted from one of said rows of energy emissive material, means for demodulating said modulated signals to form demodulated signals, subtracting means for subtracting certain of said demodulated signals from other demodulated signals to produce difference signals, auxiliary deflection means for varying the deflection of said electron beams, convergence means for varying the convergence between said electron beam, means coupling one of said difference signals to said auxiliary deflection means, and means coupling another of said difference signals to said convergence means.

11. In a television system wherein a beam deflecting means cause a plurality of electron beams to scan a target screen, a system for controlling said electron beams comprising; means for modulating certain of said electron beams with certain alternating signals, said target including rows of discrete areas of energy emissive material for providing an emitted signal in response to excitation by said electron beams, said rows of discrete areas being so arranged that certain of said electron beams may impinge on areas in at least two of said rows of areas during a particular scanning line, sensing means for sensing said emitted signal, said sensing means being operative to generate an electrical signal which varies as said energy emissions, separating means for separating said electrical signal into a plurality of modulated signals, each of said modulated signals comprising signals emitted from one of said rows of energy emissive material, means for demodulating said modulated signals to form demodulated signals, subtracting means for subtracting certain of said demodulated signals from other demodulated signals to produce difference signals, auxiliary deflection means for varying the deflection of said electron beams, convergence means for varying the convergence between said electron beam, means for adding said difference signals to produce additively combined signals, means for subtracting said difference signals to produce subtractively combined signals, means coupling said additively combined signals to said auxiliary deflection means, and means coupling said subtractively combined signals to said convergence means.

12. A color television system comprising in combination a plurality of adjacently positioned strip-like and horizontally orientated different selected component color light producing elements, a separately controlled electron scanning beam for each of said different selected component colors, a beam intensity control electrode for each of said electrode scanning beams, beam deflecting means for directing the scanning beam substantially along their respected color designated light producing elements appropriately color designated video channels connected to each of said beam intensity color electrodes, a signal mixer in certain of said channels, oscillator means individually connected with each of said signal mixers, energy emissive material superimposed in first and second rows of discrete areas on said light producing elements, said energy emissive material being so positioned as to emit modulated energy signals during a period when one of said electron beams is caused to scan a light producing element, said modulated energy signals being modulated by signals from said oscillator means, means for converting said energy signals into modulated electrical signals, separating means for isolating said modulated electrical signals into a plurality of separate modulated electrical signals, demodulating means for demodulating said separate modulated electrical signals to form comparison signals which vary as the elemental deflection of said certain of said electron scanning beams, means for comparing said comparison signals, and means for utilizing the result of said comparison to deflect certain other of said electron beams.

13. A color television system comprising in combination a plurality of adjacently positioned strip-like and horizontally orientated different selected component color light producing elements, a separately controlled electron scanning beam for each of said different selected component colors, a beam intensity control electrode for each of said electrode scanning beams, beam deflecting means for directing the scanning beams substantially along their color designating light producing elements, beams convergence means for controlling the positioning of said electron scanning beams with respect to each other, appropriately color designated video signal channels connected to each of said beam intensity color electrodes, a signal mixer in certain of said channels, oscillator means individually connected to each of said signal mixers, energy emissive material superimposed in first and second rows of discrete areas on said light producing elements, said energy emissive material being so positioned as to provide energy signals emitted during a period when one of said electron scanning beams is caused to scan a light producing element to be modulated in accordance with signals translated by the video signal channel connected with said one beam, said modulated energy signals being modulated by signals from the oscillator means associated with the video signal channel connected with said one beam, means for converting said energy signals into modulated electrical signals, separating means for isolating said modulated electrical signals into a plurality of separate modulated electrical signals, demodulating means for demodulating said separate modulated electrical signals to form comparison signals which vary as the elemental deflection of said certain of said electron scanning beams, means for comparing said comparison signals, means for utilizing a signal generated from the comparison of certain of said comparison signals to deflect said electron beams, and means for utilizing the result of the comparison of certain other of said comparison signals to correct for convergence variations between said electron scanning beams, and a filtering means in certain of video channels for eliminating signals having a frequency similar to the frequency of certain frequencies, of said modulated signal.

14. A color television system comprising in combination a plurality of adjacently positioned strip-like and horizontally orientated different selected component color light producing elements, a separately controlled electron scanning beam for each of said different selected component colors, a beam intensity control electrode for each of said electrode scanning beams, beam deflecting means for directing the scanning beams substantially along their respective color designated light producing elements, appropriately color designated video signal channels connected to each of said beam intensity color electrodes, a signal mixer in at least one of said channels, an oscillator connected to said signal mixer, an energy emissive material superimposed in first and second rows of discrete areas on said light producing elements, said energy emissive material being so positioned as to emit modulated energy signals during a period when one of said electron scanning beams is caused to scan a light producing element, said modulated energy signals comprising at least a first modulated signal comprising frequency components of a frequency of said oscillator, and a frequency of the recurrence of energy emissive material areas in one of said first rows of energy emissive material areas, a second modulated energy signal comprising frequency components of a frequency of the recurrence of energy emissive material areas in one of said second rows of energy emissive material areas, means for converting said first and second modulated energy signals into first and second modulated electrical signals respectively, separating means for isolating said modulated electrical signals, demodulating means for demodulating said modulated electrical signals to form at least a first comparison signal which varies as the elemental deflection in one direction of one of said electron scanning beams from a predetermined path, and a second comparison signal which varies as the elemental deflection in another direction of said one of said electron scanning beams from a predetermined path, means for comparing said first comparison signal and said second comparison signal, and means for utilizing the result of said comparison to deflect said electron beam.

References Cited in the file of this patent

UNITED STATES PATENTS

| | | |
|---|---|---|
| 2,231,961 | Soller | Feb. 18, 1941 |
| 2,415,059 | Zworykin | Jan. 28, 1947 |
| 2,604,534 | Graham | July 22, 1952 |
| 2,634,325 | Bond et al. | Apr. 7, 1953 |
| 2,684,454 | Huffman | July 20, 1954 |
| 2,706,216 | Lesti | Apr. 12, 1955 |